United States Patent [19]
Harshe

[11] Patent Number: 5,563,002
[45] Date of Patent: Oct. 8, 1996

[54] PROGRAMMABLE BATTERY

[75] Inventor: Girish R. Harshe, Wheeling, Ill.

[73] Assignee: Motorola, Inc., Schaumburg, Ill.

[21] Appl. No.: 391,741

[22] Filed: Feb. 21, 1995

[51] Int. Cl.$^6$ ............... H01M 10/36; H01M 2/26
[52] U.S. Cl. .............. 429/7; 429/124; 429/160; 429/161; 429/162
[58] Field of Search ............... 429/160, 161, 429/158, 162, 127, 121, 130, 150, 204, 206, 124, 7, 61

[56] References Cited

U.S. PATENT DOCUMENTS 5,338,625  8/1994  Bates et al. ............... 429/193
5,350,625  9/1994  Lake et al. ............... 429/124

*Primary Examiner*—John S. Maples
*Attorney, Agent, or Firm*—Kenneth M. Massaroni

[57] ABSTRACT

A programmable battery capable of providing a variable voltage and/or current depending upon the needs of a particular host device. The battery is formed on a separator substrate (10) and includes a plurality of discrete battery cells (102–124) which may be resettably interconnected in various configurations in order to provide varying voltage and/or current. The discrete cells (102–124) are electrically interconnected via a resettable micropositioner switch (500) The micropositioner switch determines the voltage and/or current needs of a particular device and electrically interconnects a sufficient number of discrete cells in series and/or parallel, in order to satisfy the requirements of the device.

10 Claims, 6 Drawing Sheets

5,563,002

PROGRAMMABLE BATTERY

TECHNICAL FIELD

This invention relates in general to the field of rechargeable batteries and more particularly to batteries which may be configured for a particular application.

BACKGROUND OF THE INVENTION

Complex electronic devices, such as two-way radios, cellular telephones, and computers are increasingly becoming portable as electronics are integrated into smaller, more efficient packages. Concurrently, there has been an increase in demand for quality battery systems to power these portable devices. For devices which have a high-power demand, such as cellular phones and portable computers, rechargeable battery systems, in particular nickel cadmium and nickel metal hydride-based systems are the most economic choice.

The use of batteries has presented designers of such devices with an interesting challenge; without the benefit of a regulated power supply, the device must operate over an input voltage range rather than at one particular voltage. The battery voltage is continuously changing as different device subsystems turn on and off. The problem then is to get the device to operate consistently while the bias voltage of the electronics is continuously changing. Similarly, varying applications and demands upon the device may require the battery system to have a particular current output which varies over time and in response to the particular device.

The means exist to regulate battery voltage and/or current, either in the device or in the battery itself. For example, integrated linear voltage regulators that transform raw battery voltage into a stable voltage for the device are available. Linear regulators, however, in light of the fact that operation time is a critical market feature, are prohibitively inefficient for all but very low current subsystems of the device. Switch mode regulators can provide a more efficient means of regulating battery voltage but cost and complexity also prohibit the use of such means to low current subsystems. Therefore, design of portable electronic devices is left to contend with a battery voltage that may change as much as 100% from a fully discharged state to a peak voltage while being charged.

Similarly, the current drawn from the battery may also vary depending upon the impedance. The impedance is a function of the particular circuit elements employed in the circuit, and the number of such elements actually functioning at a given time. Existing battery systems do not have the ability to reconfigure themselves to address changing current (or voltage) demands.

Accordingly, there exists a need to provide a battery pack capable of providing a variable voltage or variable current output. Further, such a battery pack should be fabricated so as to provide a large current and/or voltage while minimizing the amount of space needed to provide such a device.

DETAILED DESCRIPTION OF THE PREFERRED EMBODIMENT

Figure 1:
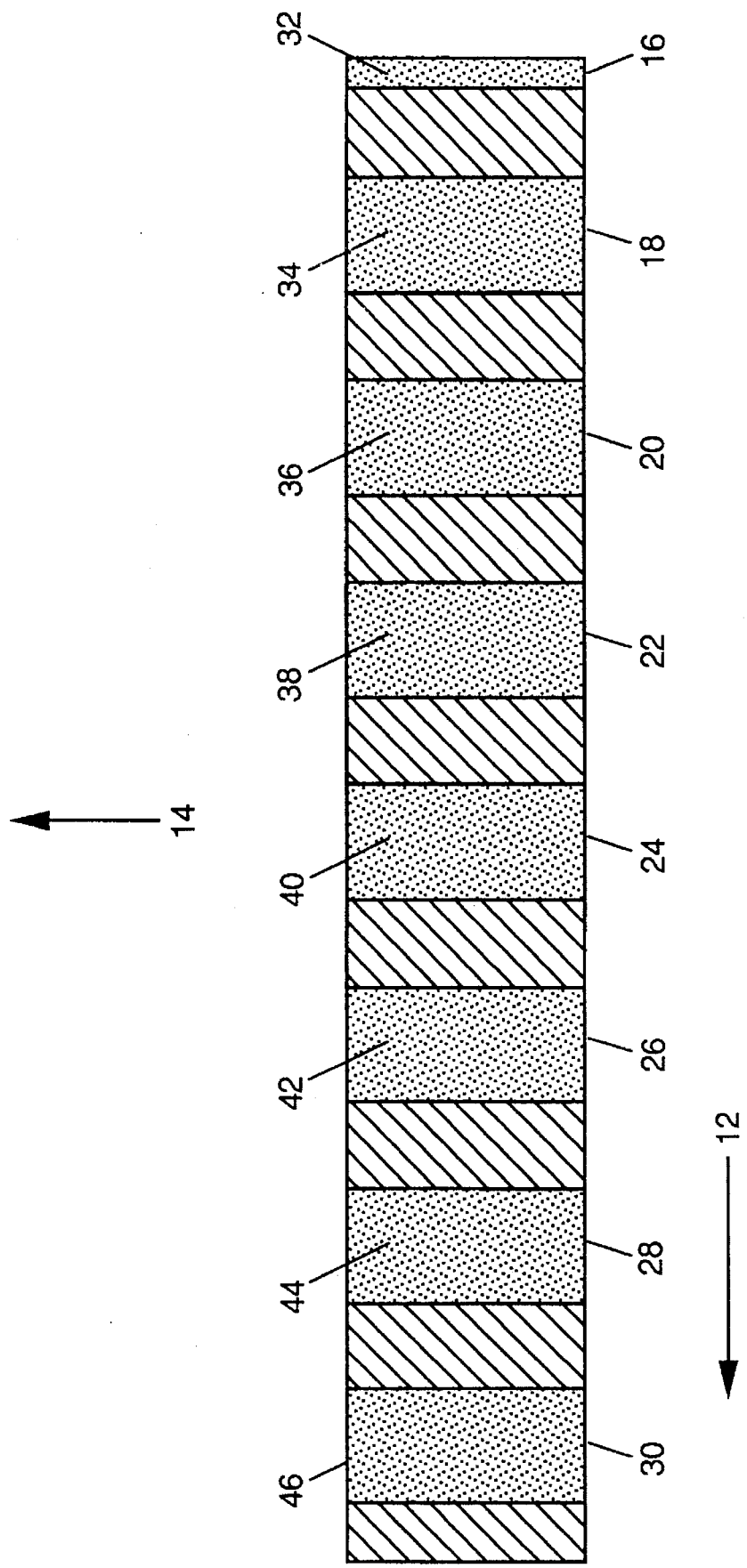
FIG. 1 is a cross sectional side view of a porous separator/separator for use in a battery pack in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross-sectional side view of a separator material (10) in accordance with the instant invention. The separator (10) also serves as a substrate upon which at least one battery cell is fabricated. The separator (10) should be of a material having unidirectional porosity in the director perpendicular to the plane of the separator. Accordingly, in the example of FIG. 1, the plane of the substrate is illustrated by arrow (12) and hence porosity is illustrated in the direction of arrow (14). The separator (10) has a plurality of pores (16, 18, 20, 22, 24, 26, 28, 30) formed therethrough. The separator may hence be fabricated from any of a number of known materials selected from the group consisting of stable ceramic materials, stable polymers, honeycomb structured ceramics, tape cast and/or fired thin ceramic substrates with formed vias, thin polymers, and combinations thereof. Alternatively, a solid ionic conductor with conductivity in only one direction may be used as the separator (10).

The pores (16–30) in separator (10) are filled with an electrolyte paste so that the separator will have conductivity only in the z direction illustrated by arrow 14. The solid electrolyte paste may be selected from any of a number of known such materials including, for example, alkaline agents as KOH or acidic agents as $H_2SO_4$, and combinations thereof. With respect to FIG. 1, the electrolyte paste is disposed in the pores. Hence, electrolyte paste layers (32, 34, 36, 38, 40, 42, 44, and 46) are disposed in pores (16–30) respectively.

Figure 2:
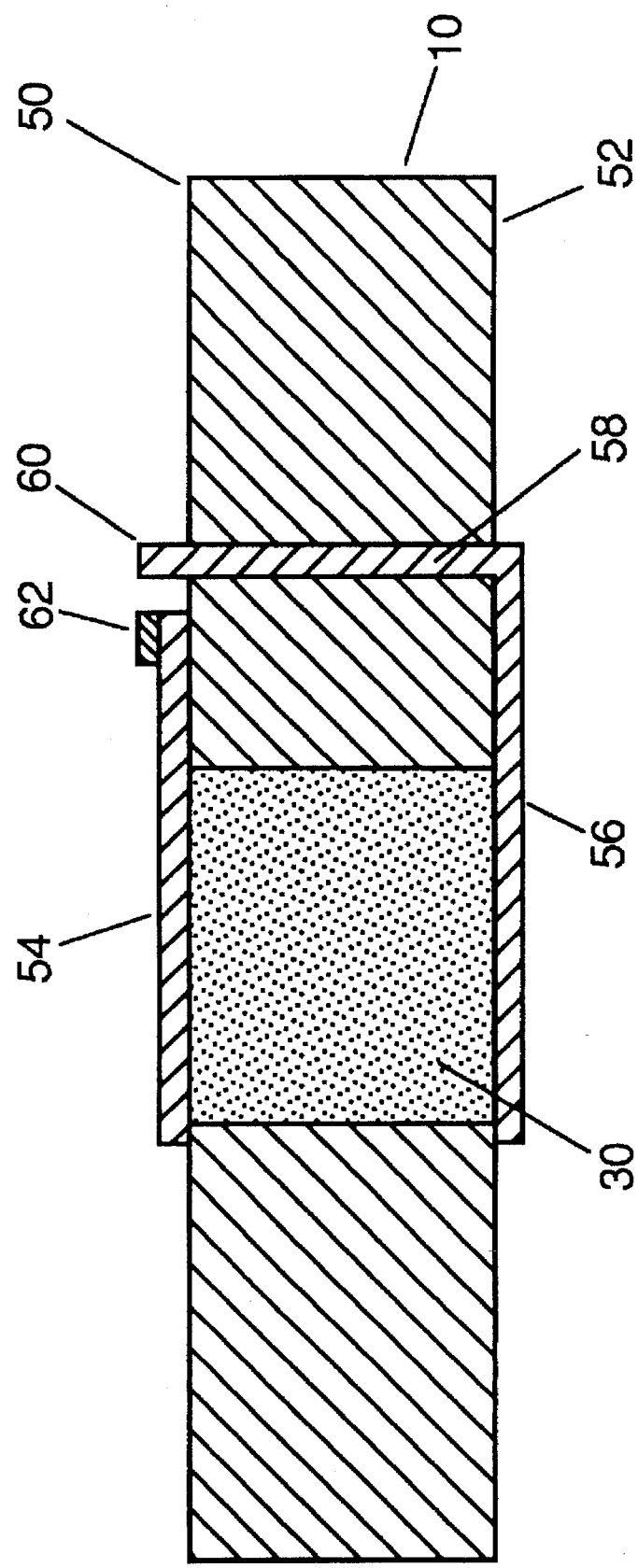
FIG. 2 is a cross sectional side view of a single battery cell in accordance with the instant invention.

Referring now to FIG. 2, there is illustrated therein a cross sectional side view of a single battery cell in accordance with the instant invention, and employing separator/substrate (10) of FIG. 1. FIG. 2 illustrates a single electrolyte-paste filled pore, for example, (30) of FIG. 1. The separator (10) has a first and second major surface (50, 52). Disposed on the first major surface, in an area substantially adjacent to the electrolyte paste-filled pore (30) is a first electrode (54). The electrode is disposed in a manner so as to be substantially a small area square electrode or other shaped electrode which is deposited substantially adjacent the pore (30) only. Disposed on second surface (52) is a second electrode (56) disposed substantially on top of the electrolyte paste-filled pore (30). The electrodes (54) and (56) may be fabricated of standard battery electrode materials as are known in the art. Examples of such materials include nickel, nickel hydroxide, nickel oxy hydroxide, cadmium, zinc, silver, lead, lead oxides, lithium, metal hydrides, manganese oxides, ruthenium oxides, tantalum, tantalum oxides, and combinations thereof. These electrodes may be fabricated and/or deposited on the separator (10) by any of a number of well-known techniques, examples of which include screen printing, spray painting, chemical vapor deposition, electrochemical deposition, or any other suitable thick or thin film technique. Thereafter, disposed atop both the first and second electrode (54 and 56) may be deposited a current collector (not shown) in a manner well known in the art. While FIG. 2 illustrates a discrete cell located adjacent a single pore, it is to be understood that each cell may encompass a plurality of such pores.

Formed through the separator (10) from the first surface (50) through to the second surface (52) is a via (58). The via is coated or filled with an electrically conducting material in a manner well known in the art. The purpose of the conducting via (58) is to electrically couple the second electrode (56) to the first surface (50) so as to form a second electrode contact region (60) on the first surface (50) of separator (10). A first electrode contact region (62) is also formed on the surface of first electrode (54) substantially adjacent to contact region (60). In this manner, electrical contact to both the first and second electrodes may be easily made on one side of the separator (10). It is to be understood that while FIG. 2 illustrates but a single discrete battery cell, a battery in accordance with the instant invention may have any number of similar cells. An advantage of the instant invention is that it allows any number of such discrete battery cells to be formed in an X-Y matrix depending upon the size of the separator (10). Each discrete cell may then be connected in series or in parallel as described in greater detail hereinbelow.

Figure 3:
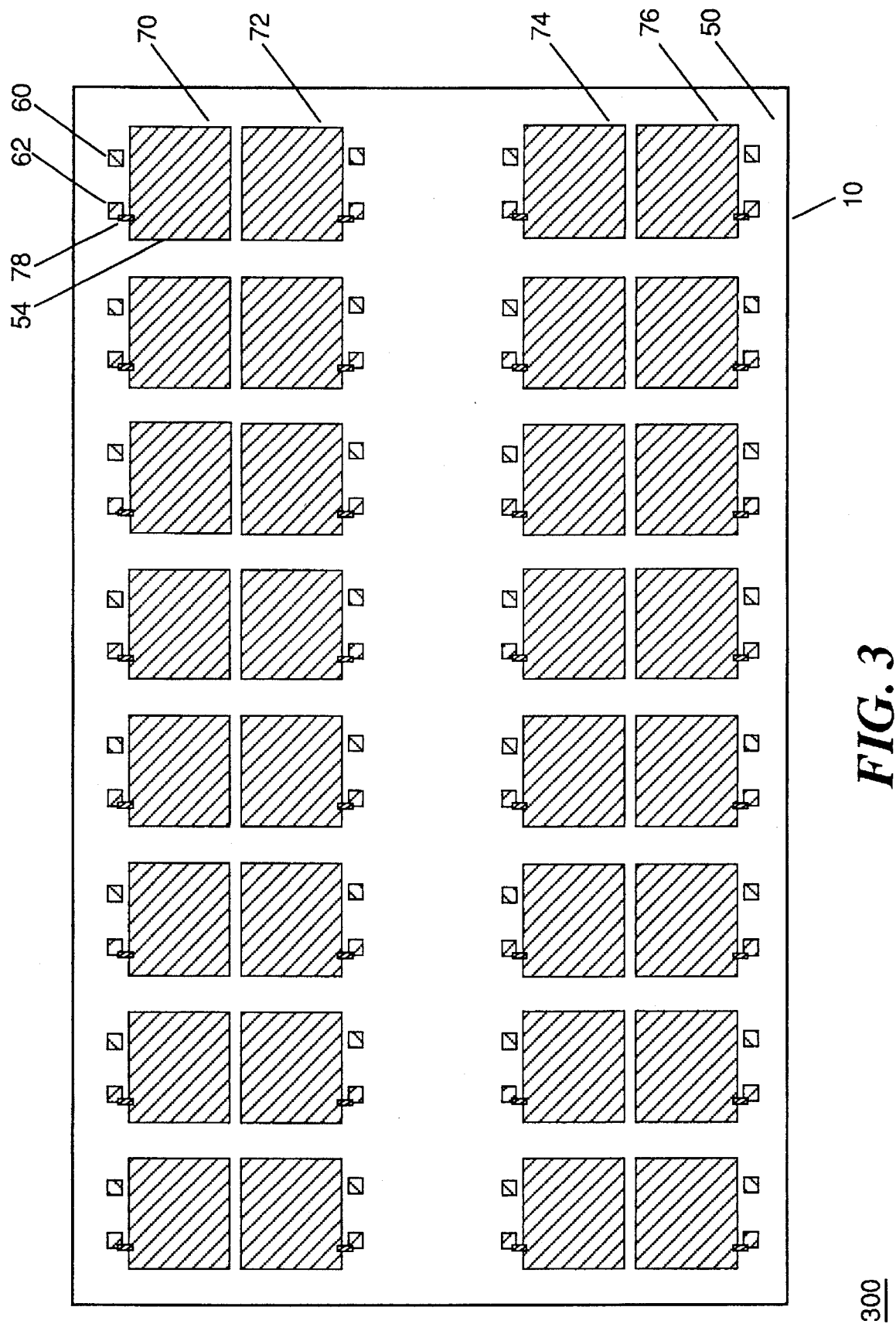
FIG. 3 is a top view of a plurality of battery cells, in accordance with the instant invention.

Referring now to FIG. 3, there is illustrated therein a top plan view of a separator (10) with a plurality of discrete cells, and connection leads as described hereinabove with respect to FIG. 2. The battery (300) includes a plurality of discrete battery cells, for example, (70, 72, 74, 76). It may be appreciated from a perusal of FIG. 3 that the device illustrated therein includes thirty-two (32) discrete battery cells arranged in an 8×4 X-Y matrix. It is to be understood that any number of such cells can be fabricated depending upon the size of the separator (10) and the dimension of the cells formed thereon.

Cell (70) includes a first electrode (54) having a first electrode contact region (62) thereto connected. Also, associated with cell (70) is second electrode contact region (60) which electrically couples the second electrode (not shown) with the first side (50) of separator (10). A perusal of FIG. 3 illustrates that the first electrode contact region (62) may be disposed either directly atop the first electrode (54) as in FIG. 2, or may be connected via a conductive lead (78) as shown in FIG. 3.

Figure 4:
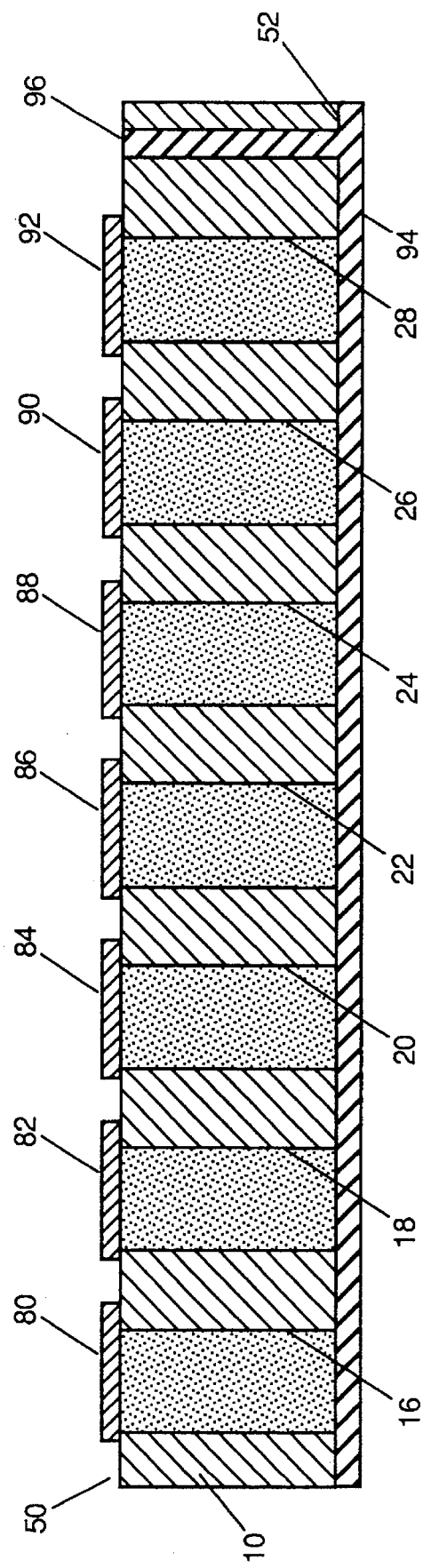
FIG. 4 is a cross sectional side view of a first alternative embodiment of a battery pack in accordance with the instant invention.

Referring now to FIG. 4, there is illustrated therein a first alternative embodiment of the battery (300) of FIGS. 2–3 above. In this embodiment, the separator (10) includes a plurality of electrolyte paste filled pores (16, 18, 20, 22, 24, 26, 28) as described hereinabove with respect to FIG. 1. Disposed on the first side (50) of separator (10) is a plurality of discrete thin film electrodes (80, 82, 84, 86, 88, 90, 92), fabricated of materials as described hereinabove with respect to FIG. 2. Disposed on the second side (52) of separator (10) is a continuous layer (94) of a second electrode material. The material itself may be as described hereinabove with respect to FIGS. 2–3. Also as described hereinabove, the second electrode layer may include a layer of a current collecting material deposited thereon.

Formed through the separator (10) is a current conducting via (96) as described hereinabove with respect to FIGS. 1–3. The current conductive via (96) is formed so as to establish electrical communication on the first side (50) of separator (10) with the second layer of electrode material (94), disposed upon second side (52) of separator (10). Each discrete first electrode (80–92) further includes connector leads (described hereinbelow with respect to FIG. 5) for connecting each said electrode with a contact pad. The advantage of the configuration illustrated in FIG. 4 is that it allows the discrete cell defined by electrodes (80–92) to be connected easily in parallel relationship.

Figure 5:
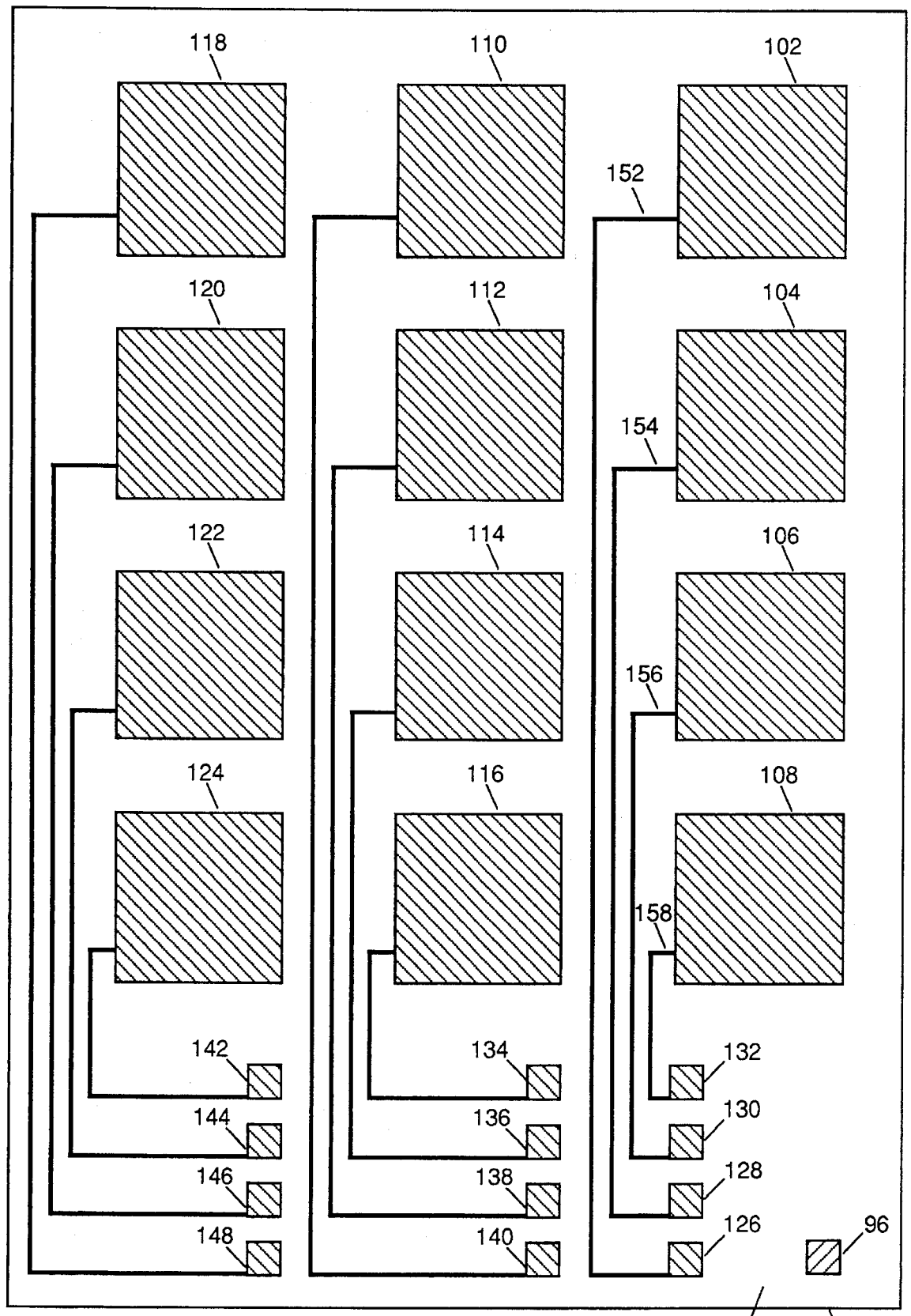
FIG. 5 is a schematic diagram of the top view of a variable current battery pack in accordance with the instant invention.

Referring now to FIG. 5, there is illustrated a top plan view of a variable current battery (400) as described hereinabove with respect to FIG. 4. The battery includes a plurality of discrete battery cells, for example, (102, 104, 106, 108, 110, 112, 114, 116, 118, 120, 122, 124) fabricated in a manner described with respect to FIG. 4. Disposed at one peripheral edge of the battery is a plurality of contact pads (126–148), each contact pad corresponding to one discrete battery cell (102–124). Each discrete cell is connected to one of the contact pads. Hence, cell (102) is electrically coupled to contact pad (126) via connector lead (152), cell (104) is connected to contact pad (128) via connector lead (154), cell (106) is connected to contact pad (130) via connector lead (156) and cell (108) is connected to contact pad (132) via connector lead (158). As maybe appreciated from a perusal of FIG. 5, each discrete cell is connected to a corresponding one contact pad via a dedicated connector lead. Also disposed at the peripheral edge of the battery is the peripheral end of conductive via (96) electrically coupling the second electrode (not shown) with the surface (50) of the separator (10).

Employing the battery devices illustrated hereinabove with respect to FIGS. 1–5, it is possible, using a resettable micropositioning connector switch, to electrically couple one or more of the battery cells described herein in series or parallel fashion in order to achieve a variable voltage or variable current battery. By resettable, it is meant that the micropositioning connector switch can sense the voltage and/or current needs of a particular device at any particular moment, and electrically interconnect a sufficient number of discrete cells in a manner to provide the required current and/or voltage.

Figure 6:
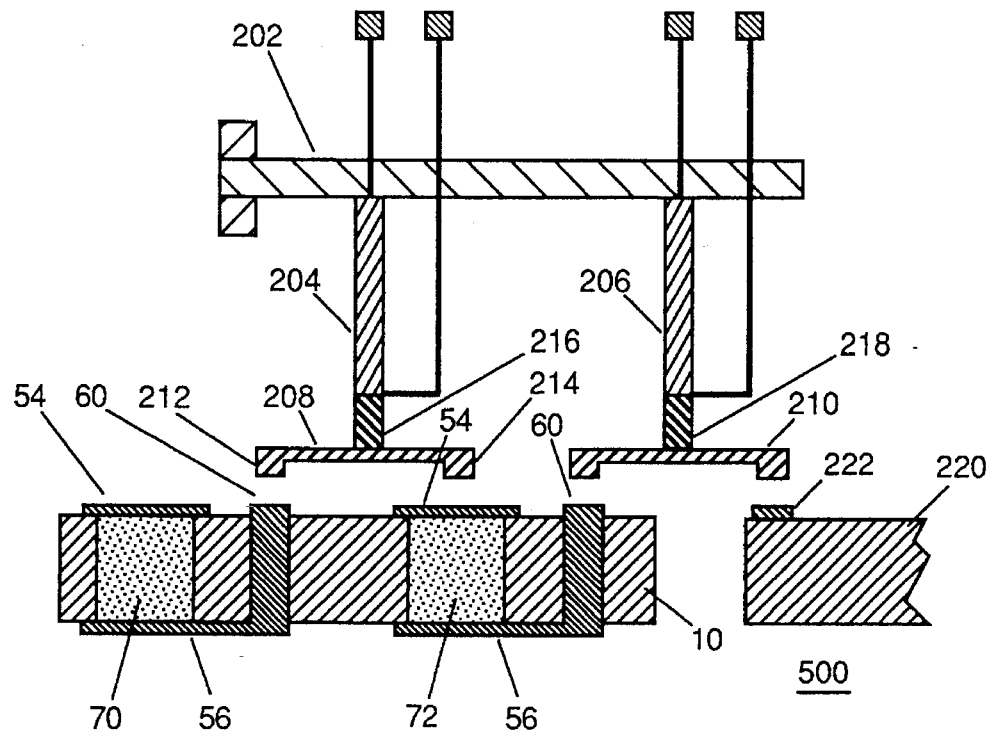
FIG. 6 is a side view of a battery pack and a resettable connector switch in the unactuated position, in accordance with the invention.
Figure 7:
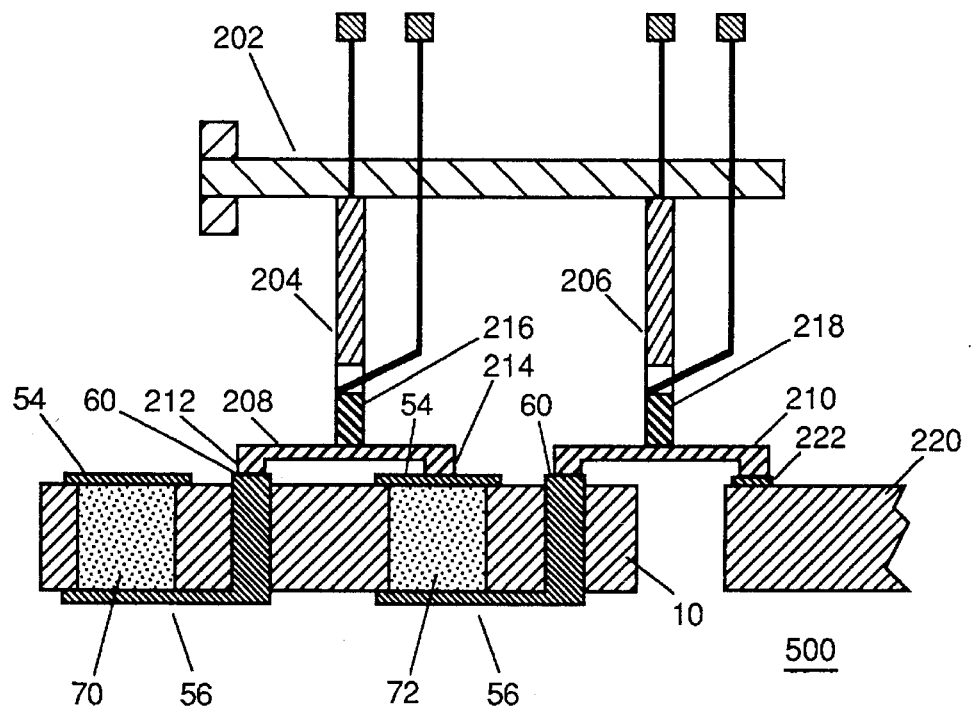
FIG. 7 is a side view of a battery pack and a resettable connector switch in the actuated position, in accordance with the instant invention.

Referring now to FIGS. 6 and 7, there is illustrated therein the resettable micropositioning connector switch which may be used in connection with the invention. The micropositioning switch may be designed using actuators involving various techniques for providing actuation. Examples of such actuators include; piezoelectric actuators, electrostrictive actuators, electromechanical actuator using micromotors, piezomagnetic actuator, magnetostrictive actuator and combinations thereof.

FIGS. 6 and 7 illustrate the micropositioning connector switch (500) in the "at rest" position (FIG. 6), and the "actuated" position (FIG. 7) respectively. As noted above, the actuated position may be effected by using piezoelectric, electrostrictive, piezomagnetic or magnetostrictive effects. A micropositioning connector switch (500) of FIGS. 6 and 7 are shown disposed in relation to a battery as illustrated hereinabove with respect to FIGS. 2 and 3. It is to be noted, however, that such switch with minor modifications could be used with equal advantage in a battery as shown in FIGS. 4 and 5. The battery illustrated in FIGS. 6 and 7 includes a separator (10) and two battery cells (70 and 72). Each cell includes first and second electrodes (54 and 56) and contact pads (60) for connecting electrodes (56) to the same side of substrate (10) as electrode (54), all as described hereinabove in FIGS. 2 and 3. The micropositioning connector switch (500) includes a rigid support member (202) from which extends a plurality of actuators (204, 206) having connector leads (208, 210) attached to the distal end portion thereof. Between actuators (204 and 206) and connector leads (208 and 210) are disposed member (216)(218) made of non-conducting materials. Non-Conducting members (216, 218) are provided to prevent current generated by each cell (70, 72) from being carried to the actuator (204, 206). Alternative, the actuators (204, 206) are fabricated of non-conductive materials so as to not allow current generated by each battery cell (70, 72) to be carried through the actuator to the micropositioning connector switch.

The connector leads (208, 210) include contact regions (212, 214) shown on connector lead (208) for effecting electrical contact with second electrode contact region (60) of battery cell (70) and first electrode (54) of battery cell (72). Accordingly, as may be appreciated from a perusal of FIG. 7, when the micropositioning connector switch (500) is in the actuated position, and more specifically actuator (204) is in the actuated position, battery cells (70 and 72) are connected in series fashion. As may be appreciated from perusal of FIG. 7, actuator 206 is also in the actuated position and thus would connect connector lead (210) to yet another battery cell (not shown). It may thus be appreciated that by providing a micropositioning connector switch, as illustrated in FIG. 6 and 7, in close proximity to a battery, such as battery (300) of FIG. 3, one may connect any number of discrete batteries in parallel fashion so as to achieve a battery having a desired voltage characteristic. Conversely, by a simple modification to the micropositioning connector switch shown in FIGS. 6 and 7, one may enable the switch to connect a plurality of discrete cells as illustrated in FIG. 5 in parallel so as to achieve a desired current characteristic for a given battery application. It is to be noted that the micropositioning connector switch is further adapted to electrically connect the battery to a host device. Hence, connector (210) may be used to contact battery cells (70 and 72) to the host device 220 battery contact 222

The actuating arms and connector leads of the micropositioning connector switch may be controlled individually and actuated at very high frequencies, typically at MHz frequencies, so that the connecting of discrete battery cells may be accomplished at very high speeds. Control of the switching may be accomplished by conventional circuit logic and software logic which may be resident in the host electronic device. The software may also employ optimization logic, so as to use each discrete cell in the battery on a rotational basis so that the cells discharge uniformly.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A programmable battery pack including a plurality of discrete battery cells, said programmable battery comprising:

a separator material having a plurality of pores formed therein, and having unidirectional ionic conductivity, the pores of said separator material being filled with an ionically conducting electrolyte;

a plurality of first battery electrodes disposed on a first side of said separator, each said first electrode formed substantially on top of at least one of said electrolyte filled pores and having a first electrode contact region associated therewith;

at least one second battery electrode disposed on a second side of said separator, said second electrode, at least one of said first electrodes and at least one of said electrolyte filled pores defining a discrete battery cell;

at least one conductive lead formed through said separator, said conductive lead electrically connected to said second battery electrode, and forming a second electrode contact region on the first side of said separator; and resettable connector switch means including a plurality of switch contacts, for connecting said discrete battery cells.

2. A battery pack as in claim 1 wherein said resettable connector switch means electrically interconnects at least one battery cell with a host device.

3. A battery pack as in claim 1, wherein said discrete battery cells are electrically coupled in parallel by said resettable connector switch means to form a variable current battery.

4. A battery pack as in claim 1, wherein said second electrode comprises a plurality of discrete, battery electrodes.

5. A battery pack as in claim 4, wherein each second battery electrode includes a conductive lead forming a second electrode contact region on said first side of said separator.

6. A battery pack as in claim 5, wherein said discrete battery cells are electrically coupled in series by said resettable connector switch, to provide a variable voltage battery pack.

7. A programmable battery including a plurality of discrete battery cells connected in parallel relationship, said programmable battery comprising:

a separator substrate having a plurality of pores formed therethrough, each said pore being filled with an electrolyte material;

a plurality of first battery electrodes disposed on a first side of said separator substrate, each said first electrode formed substantially on top of at least one of said pores;

a continuous layer of a second battery electrode material disposed on a second side of said separator substrate; and a resettable connector switch for electrically interconnecting said plurality of discrete battery cells, wherein each said discrete battery cell comprises at least one electrolyte filled pore, a corresponding first battery electrode and said layer of second battery electrode material.

8. A programmable battery as in claim 7, wherein each said resettable connector switch electrically interconnects at least one discrete battery cell to a host device.

9. A programmable battery as in claim 7, further including a conductive lead formed through said separator substrate for providing a second battery electrode contact region on said first side of said separator substrate.

10. A programmable battery as in claim 7, further including a plurality of contact regions found on said first side of said separator substrate, each said contact region being electrically connected to a corresponding one first battery electrode.

* * * * *